(12) United States Patent
Chen

(10) Patent No.: US 10,427,534 B2
(45) Date of Patent: Oct. 1, 2019

(54) INFRARED AUTOMOBILE CHARGING SYSTEM

(71) Applicant: Qing Shuang Chen, Shenzhen (CN)

(72) Inventor: Qing Shuang Chen, Shenzhen (CN)

(73) Assignee: SHENZHEN DANSHA TECHNOLOGY CO., LTD., Shenzhen, Guangdong (CN)

(*) Notice: Subject to any disclaimer, the term of this patent is extended or adjusted under 35 U.S.C. 154(b) by 177 days.

(21) Appl. No.: 15/359,585

(22) Filed: Nov. 22, 2016

(65) Prior Publication Data
US 2018/0141449 A1 May 24, 2018

(51) Int. Cl.
| | |
|---|---|
| *B60L 53/37* | (2019.01) |
| *B60L 11/18* | (2006.01) |
| *H02J 7/35* | (2006.01) |
| *H02J 7/00* | (2006.01) |
| *H02J 50/30* | (2016.01) |
| *B60L 8/00* | (2006.01) |
| *B60L 53/31* | (2019.01) |
| *B60L 53/60* | (2019.01) |

(52) U.S. Cl.
CPC .......... *B60L 11/1825* (2013.01); *B60L 8/003* (2013.01); *B60L 53/31* (2019.02); *B60L 53/37* (2019.02); *B60L 53/60* (2019.02); *H02J 7/0047* (2013.01); *H02J 7/35* (2013.01); *H02J 50/30* (2016.02); *H02J 2007/005* (2013.01); *Y02E 10/566* (2013.01)

(58) Field of Classification Search
CPC .............................. B60L 11/1825; B60L 53/37
USPC ......................................................... 320/109
See application file for complete search history.

(56) References Cited

U.S. PATENT DOCUMENTS

| | | | |
|---|---|---|---|
| 6,359,718 B1* | 3/2002 | Lin ..................... | G02B 26/0841 359/223.1 |
| 10,005,367 B2* | 6/2018 | Lee ........................ | B60L 11/182 |
| 2008/0211914 A1* | 9/2008 | Herrera .................... | H04N 7/18 348/148 |
| 2008/0267441 A1* | 10/2008 | Bux .................... | G01B 11/2755 382/100 |
| 2009/0045773 A1* | 2/2009 | Pandya ................... | B60L 5/005 320/108 |
| 2009/0092284 A1* | 4/2009 | Breed ..................... | B60J 10/00 382/103 |
| 2011/0113609 A1* | 5/2011 | Berdelle-Hilge ... | B60L 11/1822 29/426.1 |

(Continued)

*Primary Examiner* — Jerry D Robbins

(57) ABSTRACT

An infrared automobile charging system includes: a photovoltaic battery panel installed at a bottom of a vehicle; a camera module; a first actuating device connected with the camera module; an infrared light source; a second actuating device connected with the infrared light source; and a controller being connected with the camera module, the first actuating device, the infrared light source and the second actuating device. The controller is configured to control the first actuating device to rotate, and through the first actuating device control the camera module to capture a preset pattern disposed at the bottom of the vehicle. After the camera module has captured the preset pattern disposed at the bottom of the vehicle, the controller is configured to control the second actuating device to rotate accordingly so that the infrared light source projects infrared light to the photovoltaic battery panel and thereby charge the photovoltaic battery panel.

18 Claims, 3 Drawing Sheets

(56) References Cited

U.S. PATENT DOCUMENTS

| | | | |
|---|---|---|---|
| 2013/0085696 A1* | 4/2013 | Xu | B60L 3/12 |
| | | | 702/63 |
| 2017/0001527 A1* | 1/2017 | Prokhorov | B60L 11/182 |
| 2017/0225582 A1* | 8/2017 | Augst | B60L 11/1831 |
| 2017/0358944 A1* | 12/2017 | Salter | F21V 9/30 |

* cited by examiner

INFRARED AUTOMOBILE CHARGING SYSTEM

FIELD OF THE PATENT APPLICATION

The present patent application generally relates to automobile electronics and more specifically to an infrared automobile charging system.

BACKGROUND

Hybrid powered vehicles and pure electric vehicles are being used more and more widely, while how to charge electric vehicles is a problem that must be solved. Traditional wired charging methods require the vehicle to be driven to a designated charging position, and then to be charged by an electric cable. Generally the cost for building charging stations to implement such wired charging is high. In addition, the fact that the number of such charging stations is relatively small and the coverage of the charging stations is limited causes inconveniences to users of the electric vehicles.

With the development of artificial intelligence technologies, full self-driving automobiles have gradually become possible, while traditional wired charging will not be able to meet the requirements of such full self-driving automobiles. Some wireless automobile charging system charge electric vehicles through electromagnetic induction, but this method needs to generate relatively high electromagnetic radiation inside and around the vehicles. If the driver and the passengers are inside the vehicle during charging, such relatively high electromagnetic radiation would tend to cause negative effects on their health.

SUMMARY

The present patent application is directed to an infrared automobile charging system. In one aspect, the infrared automobile charging system includes: a photovoltaic battery panel installed at a bottom of a vehicle; a camera module; a first actuating device connected with the camera module; an infrared light source; a second actuating device connected with the infrared light source; and a controller being connected with the camera module, the first actuating device, the infrared light source and the second actuating device. The controller is configured to control the first actuating device to rotate, and through the first actuating device control the camera module to capture a preset pattern disposed at the bottom of the vehicle. After the camera module has captured the preset pattern disposed at the bottom of the vehicle, the controller is configured to control the second actuating device to rotate accordingly so that the infrared light source projects infrared light to the photovoltaic battery panel and thereby charge the photovoltaic battery panel. The camera module, the first actuating device, the infrared light source, the second actuating device and the controller are disposed on or below a ground. The controller is configured to analyze the preset pattern captured by the camera module, derive model information of the photovoltaic battery panel, and through searching in a first database obtain and execute a first optimal charging scheme.

The infrared automobile charging system may further include a RFID disposed on or below the ground and a RFID reader connected with the vehicle and configured to record location information of vehicle charging through reading the RFID.

The infrared automobile charging system may further include a LED light disposed under the vehicle, on/off status and color of the LED light indicating remaining power and charging status of the photovoltaic battery panel. The controller may be configured to determine remaining power and charging status of the photovoltaic battery panel according to real time image of the LED light captured by the camera module, and obtain and execute a second optimal charging scheme through searching in a second database.

The preset pattern may be dynamically displayed and configured to change under different conditions. The preset pattern may include a QR code. After charging begins, the pattern may change from the preset pattern to a pattern that represents remaining power and charging status of the photovoltaic battery panel in real time, while the controller may be configured to obtain and execute a third optimal charging scheme, according to the pattern captured by the camera module, through searching a third database.

In another aspect, the present patent application provides an infrared automobile charging system that includes: a photovoltaic battery panel installed at a bottom of a vehicle; a camera module; a first actuating device connected with the camera module; an infrared light source; a second actuating device connected with the infrared light source; a LED light disposed under the vehicle, on/off status and color of the LED light indicating remaining power and charging status of the photovoltaic battery panel; and a controller being connected with the camera module, the first actuating device, the infrared light source and the second actuating device. The controller is configured to control the first actuating device to rotate, and through the first actuating device control the camera module to capture a preset pattern disposed at the bottom of the vehicle. After the camera module has captured the preset pattern disposed at the bottom of the vehicle, the controller is configured to control the second actuating device to rotate accordingly so that the infrared light source projects infrared light to the photovoltaic battery panel and thereby charge the photovoltaic battery panel. The camera module, the first actuating device, the infrared light source, the second actuating device and the controller are disposed on or below a ground. The controller is configured to analyze the preset pattern captured by the camera module, derive model information of the photovoltaic battery panel, and through searching in a first database obtain and execute a first optimal charging scheme. The controller is configured to determine remaining power and charging status of the photovoltaic battery panel according to real time image of the LED light captured by the camera module, and obtain and execute a second optimal charging scheme through searching in a second database. The preset pattern is dynamically displayed and configured to change under different conditions.

After charging begins, the pattern may change from the preset pattern to a pattern that represents remaining power and charging status of the photovoltaic battery panel in real time, while the controller may be configured to obtain and execute a third optimal charging scheme, according to the pattern captured by the camera module, through searching a third database.

The infrared automobile charging system may further include a positioning device installed on sides of the vehicle and configured to limit position of the vehicle so that the camera module is capable of capturing the preset pattern at the bottom of the vehicle after rotating over an allowable angle.

In yet another aspect, the present patent application provides an infrared automobile charging system that includes:

a photovoltaic battery panel installed at a bottom of a vehicle; a camera module; a first actuating device connected with the camera module; an infrared light source; a second actuating device connected with the infrared light source; and a controller being connected with the camera module, the first actuating device, the infrared light source and the second actuating device. The controller is configured to control the first actuating device to rotate, and through the first actuating device control the camera module to capture a preset pattern disposed at the bottom of the vehicle. After the camera module has captured the preset pattern disposed at the bottom of the vehicle, the controller is configured to control the second actuating device to rotate accordingly so that the infrared light source projects infrared light to the photovoltaic battery panel and thereby charge the photovoltaic battery panel.

The camera module, the first actuating device, the infrared light source, the second actuating device and the controller may be disposed on or below a ground. The controller may be configured to analyze the preset pattern captured by the camera module, derive model information of the photovoltaic battery panel, and through searching in a first database obtain and execute a first optimal charging scheme.

The infrared automobile charging system may further include a RFID disposed on or below the ground and a RFID reader connected with the vehicle and configured to record location information of vehicle charging through reading the RFID.

The infrared automobile charging system may further include a LED light disposed under the vehicle, on/off status and color of the LED light indicating remaining power and charging status of the photovoltaic battery panel. The controller may be configured to determine remaining power and charging status of the photovoltaic battery panel according to real time image of the LED light captured by the camera module, and obtain and execute a second optimal charging scheme through searching in a second database.

The preset pattern may be dynamically displayed and configured to change under different conditions. The preset pattern may include a QR code. After charging begins, the pattern may change from the preset pattern to a pattern that represents remaining power and charging status of the photovoltaic battery panel in real time, while the controller may be configured to obtain and execute a third optimal charging scheme, according to the pattern captured by the camera module, through searching a third database.

The infrared automobile charging system may further include a positioning device installed on sides of the vehicle and configured to limit position of the vehicle so that the camera module is capable of capturing the preset pattern at the bottom of the vehicle after rotating over an allowable angle.

DETAILED DESCRIPTION

Reference will now be made in detail to a preferred embodiment of the infrared automobile charging system disclosed in the present patent application, examples of which are also provided in the following description. Exemplary embodiments of the infrared automobile charging system disclosed in the present patent application are described in detail, although it will be apparent to those skilled in the relevant art that some features that are not particularly important to an understanding of the infrared automobile charging system may not be shown for the sake of clarity.

Furthermore, it should be understood that the infrared automobile charging system disclosed in the present patent application is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure.

Figure 1:
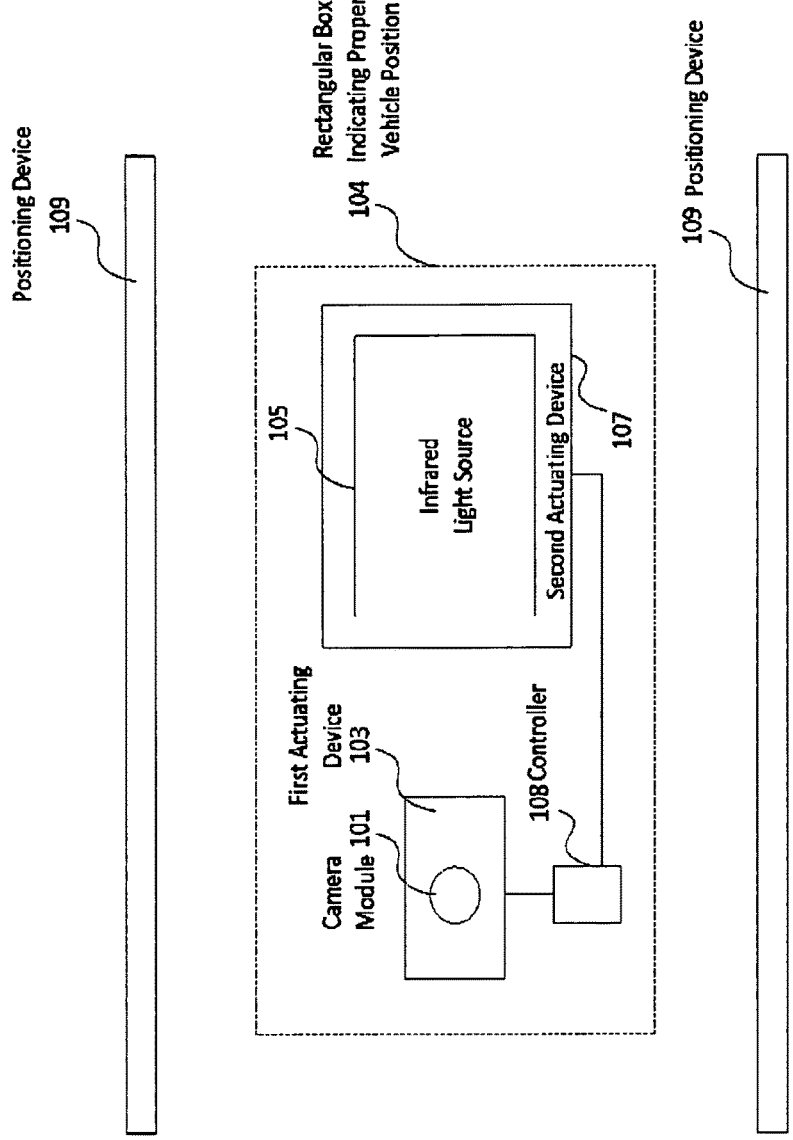
FIG. 1 is an illustrative top view of an infrared automobile charging system in accordance with an embodiment of the present patent application.

FIG. 1 is an illustrative top view of an infrared automobile charging system in accordance with an embodiment of the present patent application. Referring to FIG. 1, the infrared automobile charging system includes a photovoltaic battery panel installed at a bottom of a vehicle (not shown in FIG. 1), a camera module 101, a first actuating device 103 connected with the camera module 101, an infrared light source 105, a second actuating device 107 connected with the infrared light source 105, and a controller 108 being connected with the camera module 101, the first actuating device 103, the infrared light source 105 and the second actuating device 107. The controller 108 is configured to control the first actuating device 103 to rotate, and through the first actuating device 103 control the camera module 101 to capture a preset pattern disposed at the bottom of the vehicle. After the camera module 101 has captured the preset pattern disposed at the bottom of the vehicle, the controller 108 is configured to control the second actuating device 107 to rotate accordingly so that the infrared light source 105 projects infrared light to the photovoltaic battery panel and thereby charge the photovoltaic battery panel.

Referring to FIG. 1, the camera module 101, the first actuating device 103, the infrared light source 105, the second actuating device 107 and the controller 108 are disposed under the vehicle, and preferably, disposed on the ground or below the ground. When these components are disposed below the ground, a layer of transparent material, such as a layer of tempered glass, may be disposed over them. The infrared automobile charging system further includes a positioning device 109 installed on sides of the vehicle and configured to limit the position of the vehicle so that the camera module 101 is capable of capturing the preset pattern at the bottom of the vehicle after rotating over an allowable angle. In this embodiment, when the bottom of the vehicle overlaps with the rectangular box 104 in FIG. 1, the camera module 101 is capable of capturing the preset pattern at the bottom of the vehicle.

Figure 2:
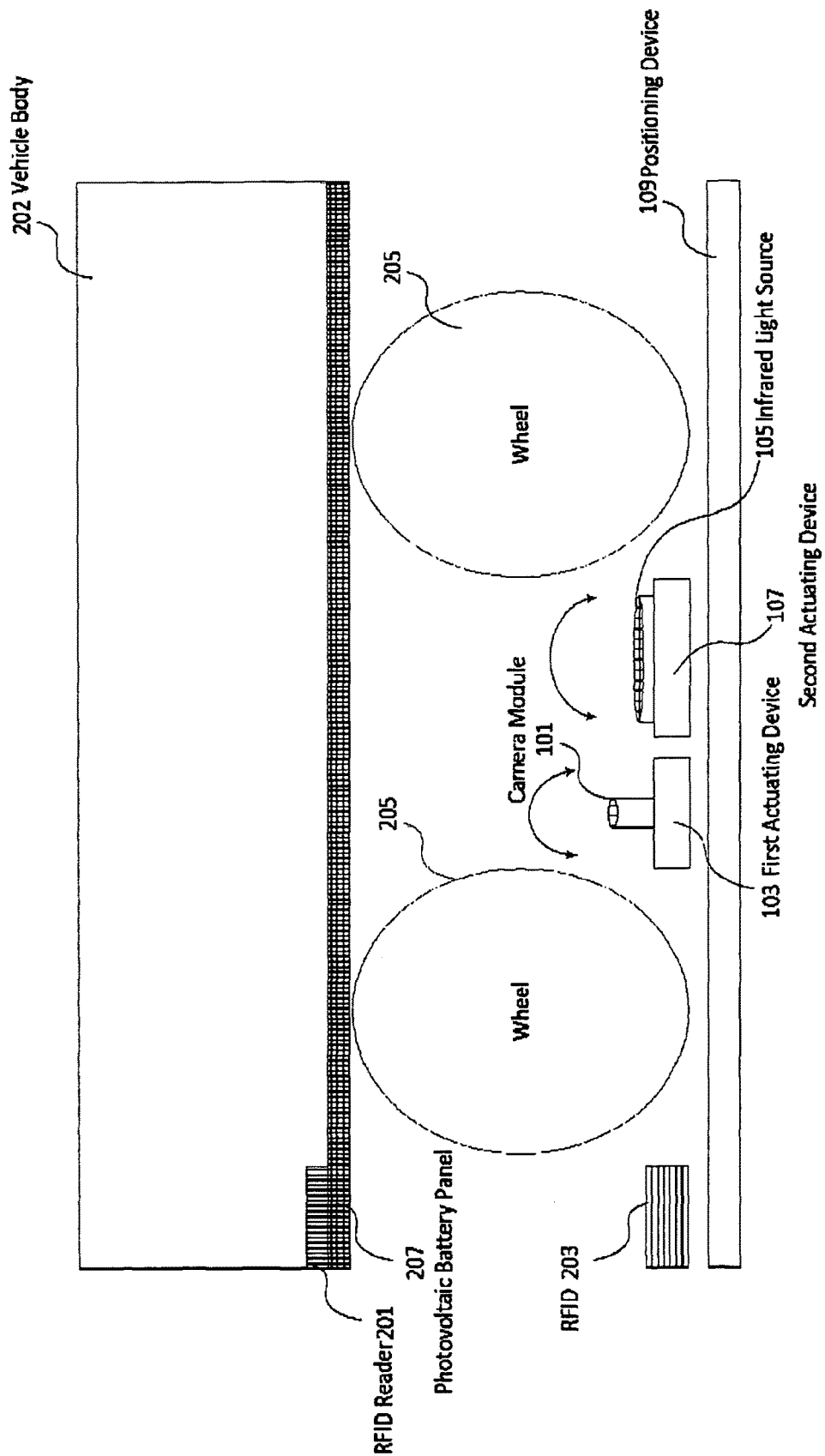
FIG. 2 is a side view of the infrared automobile charging system depicted in FIG. 1.

FIG. 2 is a side view of the infrared automobile charging system depicted in FIG. 1. Referring to FIG. 2, the vehicle includes a vehicle body 202 and four wheels 205. The photovoltaic battery panel 207 is installed below the vehicle body 202 and above the wheels 205. The infrared automobile charging system further includes a RFID reader 201 and a RFID 203. In this embodiment, the RFID reader 201 is connected with the vehicle body 202, while the RFID 203 is disposed below the vehicle body 202, and preferably, disposed on or below the ground. The RFID reader 201 is configured to record location information of vehicle charging through reading the RFID 203.

Figure 3:
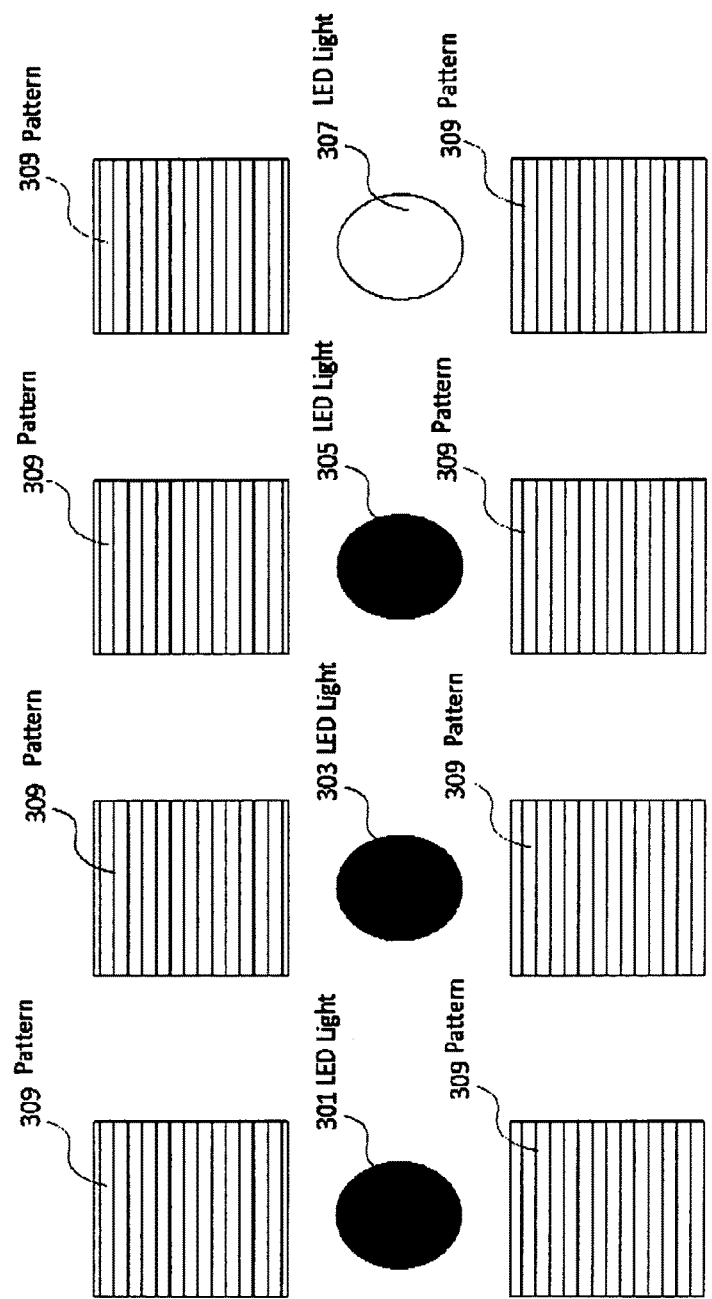
FIG. 3 illustrates preset patterns at a bottom of a vehicle in the embodiment depicted in FIG. 1.

FIG. 3 illustrates preset patterns at the bottom of the vehicle in the embodiment depicted in FIG. 1. Referring to FIG. 3, the preset pattern set includes one or multiple patterns 309 disposed at the bottom of the vehicle body 202. The pattern 309 may be a QR code. When there are multiple patterns 309, the multiple patterns 309 may be identical to each other, or different from each other. In this embodiment, the patterns 309 are dynamically displayed. In other words, the patterns 309 may change under different conditions in real time.

Referring to FIG. 3, the infrared automobile charging system further includes one or multiple LED lights disposed under the vehicle body 202. In this embodiment, the on/off status and the color of the four LED lights 301-307 indicate the remaining power and the charging status of the photovoltaic battery panel. For example, when the LED lights 301, 303 and 305 are red and constant on while the LED light 307 is off, it indicates that 25% of the total amount of power of the photovoltaic battery panel is remained, and the photovoltaic battery panel is not being charged. When the LED lights 301, 303 and 305 are red and constant on while the LED light 307 is green and blinking, it indicates that 25% of the total amount of power of the photovoltaic battery panel is remained, and the photovoltaic battery panel is being charged. It is noted that in this embodiment, the total area of the patterns 309 and the LED lights 301-307 is relatively very small compared to the effective area of the photovoltaic battery panel, and therefore their configuration does not affect the normal charging of the photovoltaic battery panel.

The optimal charging schemes required by different models of photovoltaic battery panels are generally different. In this embodiment, the controller 108 controls the second actuating device 107 to rotate according to the preset pattern captured by the camera module 101, so that the infrared light source 105 projects infrared light to the photovoltaic battery panel and thereby charges the photovoltaic battery panel. At the same time, the controller 108 is configured to choose a first optimal charging scheme that is suitable to the photovoltaic battery panel carried by the vehicle according to the preset pattern. More specifically, the controller 108 is configured to analyze the preset pattern, derive the model information of the photovoltaic battery panel, and through searching in a first database obtain and execute the first optimal charging scheme.

The photovoltaic battery panels of the same model generally requires different optimal charging schemes under different conditions. In this embodiment, the controller 108 is configured to analyze the remaining power and the charging status of the photovoltaic battery panel according to the real time image of the LED lights captured by the camera module 101, and select a second optimal charging scheme that is the most suitable for the photovoltaic battery panel under the current charging status. More specifically, the controller 108 is configured to determine the remaining power and the charging status of the photovoltaic battery panel through analyzing the real time image of the LED lights, and obtain and execute the second optimal charging scheme through searching in a second database.

In another embodiment, the patterns 309 are dynamically displayed. After the charging begins, the pattern 309 changes from the preset pattern to a pattern that represents the remaining power and the charging status of the photovoltaic battery panel in real time. The controller 108 is configured to obtain and execute a third optimal charging scheme that is suitable for the photovoltaic battery panel under the current charging status, according to the pattern captured by the camera module 101, through searching a third database.

The infrared automobile charging systems provided by the above embodiments can be conveniently installed on the road on which the vehicle is driving or slightly below the road surface. Vehicles, during driving, only need to pause for a moment to be charged. When the processing speed of the infrared automobile charging systems is fast enough, the vehicles can be charged even when moving slowly without a full stop. Therefore this system is especially suitable to be installed in waiting area or slow moving zones at traffic lights or toll points. When using the infrared automobile charging systems to charge vehicles, the drivers and the passengers do not need to step out of the vehicles, which is very convenient. Because infrared light photovoltaic charging is used, the infrared automobile charging system does not generate electromagnetic radiation that is harmful to human health, and therefore the safety of the system is greatly superior than that of wireless automobile charging systems based on electromagnetic radiation.

While the present patent application has been shown and described with particular references to a number of embodiments thereof, it should be noted that various other changes or modifications may be made without departing from the scope of the present invention.

What is claimed is:

1. An infrared automobile charging system comprising:
   a photovoltaic battery panel installed at a bottom of a vehicle;
   a camera module;
   a first actuating device connected with the camera module;
   an infrared light source;
   a second actuating device connected with the infrared light source; and
   a controller being connected with the camera module, the first actuating device, the infrared light source and the second actuating device;
   the controller being configured to control the first actuating device to rotate, and through the first actuating device control the camera module to capture a preset pattern disposed at the bottom of the vehicle;
   after the camera module has captured the preset pattern disposed at the bottom of the vehicle, the controller being configured to control the second actuating device to rotate accordingly so that the infrared light source projects infrared light to the photovoltaic battery panel and thereby charge the photovoltaic battery panel;
   wherein:
   the camera module, the first actuating device, the infrared light source, the second actuating device and the controller are disposed on or below a ground; and
   the controller is configured to choose a first optimal charging scheme that is suitable to the photovoltaic battery panel based on the preset pattern captured by the camera module by analyzing the preset pattern, deriving model information of the photovoltaic battery panel from the preset pattern, searching in a first database and according to the search result obtaining and executing the first optimal charging scheme.

2. The infrared automobile charging system of claim 1 further comprising a RFID disposed on or below the ground and a RFID reader connected with the vehicle and configured to record location information of vehicle charging through reading the RFID.

3. The infrared automobile charging system of claim 1 further comprising a LED light disposed under the vehicle, wherein on/off status and color of the LED light indicate remaining power and charging status of the photovoltaic battery panel.

4. The infrared automobile charging system of claim 3, wherein the controller is configured to determine remaining power and charging status of the photovoltaic battery panel according to real time image of the LED light captured by the camera module, and obtain and execute a second optimal charging scheme through searching in a second database.

5. The infrared automobile charging system of claim 1, wherein the preset pattern is dynamically displayed and configured to change under different conditions.

6. The infrared automobile charging system of claim 5, wherein the preset pattern comprises a QR code.

7. The infrared automobile charging system of claim 5, wherein after charging begins, the pattern changes from the preset pattern to a pattern that represents remaining power and charging status of the photovoltaic battery panel in real time, while the controller is configured to obtain and execute a third optimal charging scheme, according to the pattern captured by the camera module, through searching a third database.

8. An infrared automobile charging system comprising:
a photovoltaic battery panel installed at a bottom of a vehicle;
a camera module;
a first actuating device connected with the camera module;
an infrared light source;
a second actuating device connected with the infrared light source;
a LED light disposed under the vehicle, on/off status and color of the LED light indicating remaining power and charging status of the photovoltaic battery panel; and
a controller being connected with the camera module, the first actuating device, the infrared light source and the second actuating device;
the controller being configured to control the first actuating device to rotate, and through the first actuating device control the camera module to capture a preset pattern disposed at the bottom of the vehicle;
after the camera module has captured the preset pattern disposed at the bottom of the vehicle, the controller being configured to control the second actuating device to rotate accordingly so that the infrared light source projects infrared light to the photovoltaic battery panel and thereby charge the photovoltaic battery panel;
wherein:
the camera module, the first actuating device, the infrared light source, the second actuating device and the controller are disposed on or below a ground;
the controller is configured to choose a first optimal charging scheme that is suitable to the photovoltaic battery panel based on the preset pattern captured by the camera module by analyzing the preset pattern, deriving model information of the photovoltaic battery panel from the preset pattern, searching in a first database and according to the search result obtaining and executing the first optimal charging scheme;
the controller is configured to determine remaining power and charging status of the photovoltaic battery panel according to real time image of the LED light captured by the camera module, and obtain and execute a second optimal charging scheme through searching in a second database; and
the preset pattern is dynamically displayed and configured to change under different conditions.

9. The infrared automobile charging system of claim 8, wherein after charging begins, the pattern changes from the preset pattern to a pattern that represents remaining power and charging status of the photovoltaic battery panel in real time, while the controller is configured to obtain and execute a third optimal charging scheme, according to the pattern captured by the camera module, through searching a third database.

10. The infrared automobile charging system of claim 8 further comprising a positioning device installed on sides of the vehicle and configured to limit position of the vehicle so that the camera module is capable of capturing the preset pattern at the bottom of the vehicle after rotating over an allowable angle.

11. An infrared automobile charging system comprising:
a photovoltaic battery panel installed at a bottom of a vehicle;
a camera module;
a first actuating device connected with the camera module;
an infrared light source;
a second actuating device connected with the infrared light source; and
a controller being connected with the camera module, the first actuating device, the infrared light source and the second actuating device; wherein:
the controller is configured to control the first actuating device to rotate, and through the first actuating device control the camera module to capture a preset pattern disposed at the bottom of the vehicle;
after the camera module has captured the preset pattern disposed at the bottom of the vehicle; the controller is configured to control the second actuating device to rotate accordingly so that the infrared light source projects infrared light to the photovoltaic battery panel and thereby charge the photovoltaic battery panel; and
the controller is configured to choose a first optimal charging scheme that is suitable to the photovoltaic battery panel based on the preset pattern captured by the camera module by analyzing the preset pattern, deriving model information of the photovoltaic battery panel from the preset pattern, searching in a first database and according to the search result obtaining and executing the first optimal charging scheme.

12. The infrared automobile charging system of claim 11 further comprising a RFID disposed on or below the ground and a RFID reader connected with the vehicle and configured to record location information of vehicle charging through reading the RFID.

13. The infrared automobile charging system of claim 11 further comprising a LED light disposed under the vehicle, on/off status and color of the LED light indicating remaining power and charging status of the photovoltaic battery panel.

14. The infrared automobile charging system of claim 13, wherein the controller is configured to determine remaining power and charging status of the photovoltaic battery panel according to real time image of the LED light captured by the camera module, and obtain and execute a second optimal charging scheme through searching in a second database.

15. The infrared automobile charging system of claim 11, wherein the preset pattern is dynamically displayed and configured to change under different conditions.

16. The infrared automobile charging system of claim 15, wherein the preset pattern comprises a QR code.

17. The infrared automobile charging system of claim 15, wherein after charging begins, the pattern changes from the preset pattern to a pattern that represents remaining power and charging status of the photovoltaic battery panel in real time, while the controller is configured to obtain and execute a third optimal charging scheme, according to the pattern captured by the camera module, through searching a third database.

18. The infrared automobile charging system of claim 11 further comprising a positioning device installed on sides of the vehicle and configured to limit position of the vehicle so that the camera module is capable of capturing the preset pattern at the bottom of the vehicle after rotating over an allowable angle.

* * * * *